United States Patent
Nam (10) Patent No.: US 8,210,957 B2
(45) Date of Patent: Jul. 3, 2012

(54) GOLF SWING TRAINING MACHINE

(76) Inventor: Joong-Hoon Nam, Gyungsan-si (KR)

( * ) Notice: Subject to any disclaimer, the term of this patent is extended or adjusted under 35 U.S.C. 154(b) by 576 days.

(21) Appl. No.: 12/301,749

(22) PCT Filed: May 23, 2007

(86) PCT No.: PCT/KR2007/002487
§ 371 (c)(1),
(2), (4) Date: Nov. 20, 2008

(87) PCT Pub. No.: WO2007/136223
PCT Pub. Date: Nov. 29, 2007

(65) Prior Publication Data
US 2009/0111597 A1 Apr. 30, 2009

(30) Foreign Application Priority Data

May 23, 2006 (KR) .................. 10-2006-0046234
Jun. 9, 2006 (KR) .................. 10-2006-0051987

(51) Int. Cl.
*A63B 57/00* (2006.01)
(52) U.S. Cl. ........................ 473/132; 473/278
(58) Field of Classification Search .......... 473/278–279, 473/132–134
See application file for complete search history.

(56) References Cited

U.S. PATENT DOCUMENTS

| 5,022,657 | A | * | 6/1991 | Bussiere et al. | ............ | 473/137 |
| 5,078,401 | A | * | 1/1992 | Fehrenbach et al. | .......... | 473/133 |
| 5,603,664 | A | * | 2/1997 | Provost | ........................ | 473/134 |
| 5,895,325 | A | | 4/1999 | Tomey | | |
| 5,916,033 | A | | 6/1999 | Doherty | | |
| 6,165,082 | A | | 12/2000 | Cox | | |
| 7,131,911 | B2 | * | 11/2006 | Kim | ............................. | 473/279 |
| 2002/0091007 | A1 | * | 7/2002 | Hollrock | ........................ | 473/132 |
| 2004/0229705 | A1 | * | 11/2004 | Hollrock | ........................ | 473/132 |
| 2004/0259652 | A1 | | 12/2004 | Paicos | | |

(Continued)

FOREIGN PATENT DOCUMENTS

JP       61-213071 A       9/1986

(Continued)

OTHER PUBLICATIONS

English Translation for JP 612-213071, Nakaba Tazaki et al., Tee device for golf, Sep. 22, 1986, 9 pages.*

(Continued)

*Primary Examiner* — Dmitry Suhol
*Assistant Examiner* — Alex F. R. P. Rada, II
(74) *Attorney, Agent, or Firm* — Park & Associates IP Law, P.C.

(57) ABSTRACT

Disclosed is a golf swing training machine, which allows a golf beginner to comfortably strike a golf ball in a stable mental state without a burden from the golf ball, thus allowing the golf beginner to effectively master a swing posture in a short period of time. In the golf swing training machine, a tee having a golf ball laid thereon and a tee having no golf ball laid thereon are alternately located at a striking point, or one tee is provided at the striking point such that a golf ball is not laid on the tee during aiming and then is laid on the tee just before a point of the striking time, thereby allowing a trainee to aim at the tee having no golf ball during aiming and thus to strike the golf ball in a stable mental state.

6 Claims, 10 Drawing Sheets

U.S. PATENT DOCUMENTS

2005/0282646 A1 * 12/2005 Chen .................... 473/132

FOREIGN PATENT DOCUMENTS

| JP | 61-213072 A | | 9/1986 |
|----|----|----|----|
| JP | 61213071 | * | 9/1986 |
| JP | 61213072 | * | 9/1986 |
| JP | 01-277582 A | | 11/1989 |
| JP | 09-285584 | | 11/1997 |
| JP | 09-285584 A | | 11/1997 |
| KR | 1019990025656 | | 4/1999 |
| KR | 1020030042192 | | 5/2003 |
| KR | 100486019 | | 4/2005 |
| WO | 2005/023380 A1 | | 3/2005 |

OTHER PUBLICATIONS

English Translation for JP 612-213072, Nakaba Tazaki et al., Tee device for golf, Sep. 22, 1986, 12 pages.*

* cited by examiner

GOLF SWING TRAINING MACHINE

TECHNICAL FIELD

The present invention relates to a golf swing training machine, and more particularly to a golf swing training machine, in which a tee having a golf ball laid thereon and a tee having no golf ball laid thereon are alternately located at a striking point, or one tee is provided at the striking point such a golf ball is not laid on the tee during aiming and then is laid on the tee just before a point of the striking time, thus allowing a golf trainee to swing and strike the golf ball in a stable mental state.

BACKGROUND ART

In general, golf beginners learn a swing posture through practice in an indoor golf practice range, and then enjoy golf in a field. In order to effectively facilitate the practice of the swing posture, a golf swing training machine is used.

Figure 11:
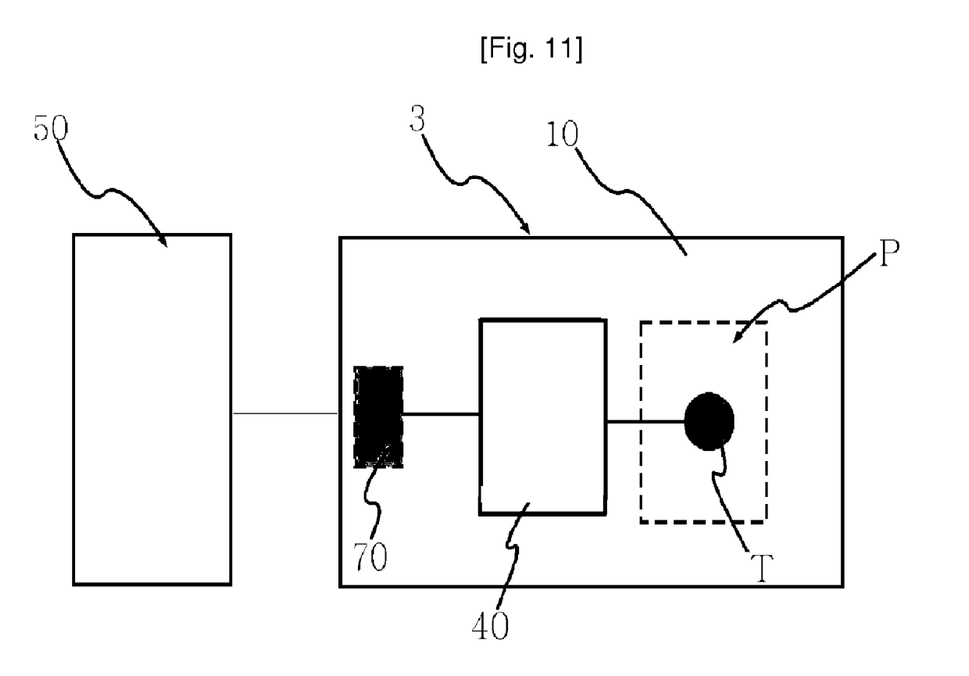
FIG. 11 is a schematic view illustrating the basic structure of a conventional golf swing training machine.

In such a golf swing training machine 3, as shown in FIG. 11, one tee (T) is installed at a striking point (P) on a training board 10, and a golf ball automatically supplied from a golf ball supply device 50 under the control of a microcomputer 40 is laid on the tee (T). Thus, whenever a golf ball is supplied onto the tee (T) at the striking point (P), a trainee aims at the golf ball laid on the tee (T), and then strikes the golf ball with a club, thus practicing a swing. Here, non-described reference numeral 70 represents a power supply module.

Most golf beginners assume a natural swing posture when they strike a tee, on which a golf ball is not laid, but assume an unstable swing posture, such as a head-up, due to excessively large strength supplied into their bodies caused by a heavy mental burden for more satisfactorily striking a golf ball on the tee when they substantially aims at the golf ball on the tee and strike the golf ball.

The above problems can be corrected also through repeated swing practice. However, the golf beginners must repeat the swing practice for a long period of time, and thus the efficiency for requiring great skill is lowered.

DISCLOSURE OF INVENTION

Technical Problem

Therefore, the present invention has been made in view of the above problems, and it is an object of the present invention to provide a golf swing training machine, in which no golf ball is laid at a striking point on a training board, when a trainee aims at the striking point, and a golf ball comes to be laid on a tee located at the striking point just when a head of a golf club becomes adjacent to the striking point, thus allowing the trainee to learn swing and striking postures in a stable mental state.

Technical Solution

In accordance with an aspect of the present invention, the above and other objects can be accomplished by the provision of a golf swing training machine comprising a striking tee provided with a seat, on which a golf ball supplied from a golf ball supply device is laid, and an aiming tee provided with a seat, on which no golf ball is laid, said striking and aiming tees are installed at a striking point on a training board such that they are adjacent to each other; and a microcomputer for controlling the striking and aiming tees such that they are alternately located at the striking point, wherein when a trainee aims at the striking point, the aiming tee is located at the striking point on the training board, and when a head of a golf club, finishing a back swing motion, reaches a position adjacent to the striking point, the striking tee provided with the seat having the golf ball laid thereon is located at the striking point on the training board.

Preferably, a pair of concaves for respectively receiving the aiming tee and the striking tee is formed in the upper surface of the training board at the striking point, elevating rods ascending and descending under the control of the microcomputer are respectively prepared in the concaves, and the aiming tee and the striking tee are respectively installed in the elevating rods so that the aiming tee and the striking tee are alternately located at the striking point on the training board by the ascent and descent of the elevating rods.

Further, preferably, a turntable rotated in one direction by the operation of an electric motor is provided at the striking point on the training board, and the aiming tee and the striking tee are installed on the edge of the turntable at a designated interval, so that the aiming tee and the striking tee are alternately located at the striking point on the training board by the rotation of the turntable due to the operation of the electric motor.

In accordance with another aspect of the present invention, there is provided a golf swing training machine comprising a training board, on which a striking point is formed; a tee protruded from the striking point on the training board; a golf ball supply module for supplying golf balls to the upper end of the tee one by one; a sensor installed at the striking point for sensing the movement of a head of a golf club into and out of the striking point; and a microcomputer measuring a swing interval using a point of time, when the head of the golf club secedes from the striking point in a trainee's initial swing motion, as a starting point and a point of time, when the head of the golf club re-enters the striking point, as an ending point through the sensor, and then calculating a time to reach an ending point of the trainee's subsequent swing motion using a point of time, when the head of the golf club secedes from the striking point in this swing motion, as a starting point of this swing motion based on the measured swing interval, so that the microcomputer drives the golf ball supply module to supply a golf ball onto the tee just before it reaches the ending point of this swing motion.

Preferably, the tee has a hollow structure, the upper portion of which is opened; and the golf ball supply modules includes a golf ball supply channel, through which the golf balls are supplied, formed under the striking point of the training board, and an elevating rod, which ascends and descends in a hollow of the tee, for receiving the golf balls supplied from the golf ball supply channel one by one and exposing the golf balls to the outside through the upper surface of the tee.

Further, preferably, the golf ball supply module is installed at one side of the tee, and shoots the golf balls onto the upper end of the tee one by one.

ADVANTAGEOUS EFFECTS

The golf swing training machine of the present invention is used as golf swing and striking training equipment for golf beginners in an indoor golf practice range, and allows trainees to comfortably strikes a golf ball in a stable mental state so as to eliminate a mental burden of beginners to the golf ball, thus allowing the beginners to master a swing posture and a striking posture in a short period of time.

BRIEF DESCRIPTION OF THE DRAWINGS

The above and other objects, features and other advantages of the present invention will be more clearly understood from the following detailed description taken in conjunction with the accompanying drawings, in which:

FIGS. 2 to 4 respectively illustrate golf swing training machines in accordance with a first embodiment of a first aspect of the present invention, to which an alternate structure of an aiming tee and a striking tee by means of ascent and descent is applied, more particularly:

FIGS. 5 and 6 illustrate a golf swing training machine in accordance with a second embodiment of the first aspect of the present invention, to which an alternate structure of an aiming tee and a striking tee by means of rotation is applied, more particularly:

BEST MODE FOR CARRYING OUT THE INVENTION

Now, preferred embodiments of the present invention will be described in detail with reference to the annexed drawings.

First, FIGS. 1 to 6 illustrate golf swing training machines in accordance with several embodiments of a first aspect of the present invention. In each of these golf swing training machines 1, 1' and 1" an aiming tee 20 and a striking tee 30 are alternately located at a striking point (P) on a training board 10, so that in an aiming process, the aiming tee 20 on which no golf ball is laid is located at the striking point (P) on the training board 10, and in a striking process, the striking tee 30 on which a golf ball (B) is laid is located at the striking point (P) on the training board 10, thus allowing a trainee to strike the golf ball (B) in a stable mental state without a burden from the golf ball (B).

More specifically, each of the golf swing training machines 1, 1' and 1" includes the training board 10, on which the striking point (P) is formed, the aiming tee 20 and the striking tee 30, which are alternately located at the striking point (P) on the training board 10, a microcomputer 40 for controlling the aiming tee 20 and the striking tee 30 such that the aiming tee 20 and the striking tee 30 are alternately located at the striking point (P) on the training board 10 in a designated cycle, and a power supply module 70 for supplying power to the microcomputer 40.

No golf ball (B) is laid on a seat 21 of the aiming tee 20. On the other hand, the golf balls (B) are supplied from a golf ball supply device 50 to a seat 31 of the striking tee 30 one by one, and thus the striking tee 30 is located at the striking point (P) under the condition that one golf ball (B) is laid on the seat 31 of the striking tee 30 at all times.

Here, the structure of the golf ball supply device 50 for supplying the golf balls (B) to the striking tee 30 and the process for laying the golf balls (B) on the seat 31 of the striking tee 30 through the golf ball supply device 50 are substantially the same as those in a conventional golf swing training machine, and a detailed description thereof will be thus omitted because it is considered to be unnecessary.

These golf swing training machines 1, 1' and 1" differ from the conventional golf swing training machine in that the aiming tee 20 provided with no golf ball laid thereon separately from the striking tee 30 is prepared at the striking point (P) on the training board 10 such that the aiming tee 20 and the striking tee 30 are alternately located at the striking point (P) on the training board 10 under the control of the microcomputer 40.

There are provided several structures for alternately locating the aiming tee 20 and the striking tee 30 at the striking point (P) on the training board 10. For example, in the first embodiment as shown in FIGS. 2 to 4, the aiming tee 20 and the striking tee 30 are alternately located at the striking point (P) on the training board 10 by means of the alternate ascent and descent of the aiming tee 20 and the striking tee 30, and in the second embodiment as shown in FIGS. 5 and 6, the aiming tee 20 and the striking tee 30 are alternately located at the striking point (P) on the training board 10 by means of the rotation of a turntable 17.

First, the alternate structure of the aiming tee 20 and the striking tee 30 by means of ascent and descent will be described in detail. As shown in FIGS. 2 to 4, a pair of concaves 11 and 12 for receiving the aiming tee 20 and the striking tee 30 is formed in the upper surface of the training board 10 at the striking point (P), and elevating rods 13 or 13' are respectively prepared in the concaves 11 and 12. Then, the aiming tee 20 and striking tee 30 are alternately located at the striking point (P) on the training board 10 by the alternate ascent and descent of the elevating rods 13 or 13'.

Figure 1:
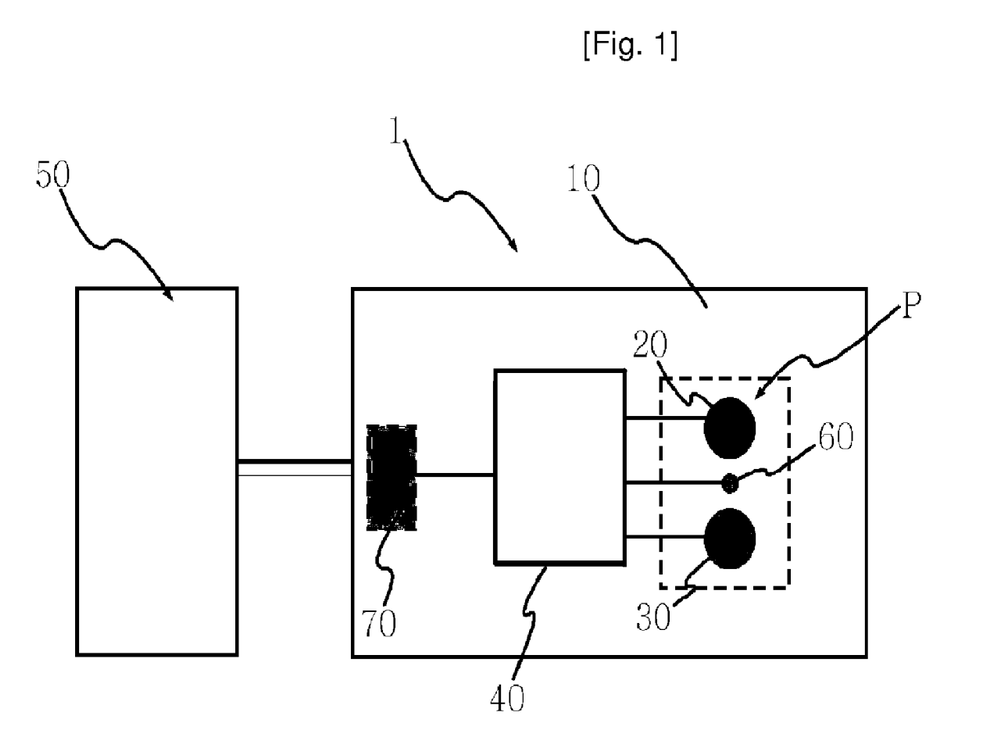
FIG. 1 is a schematic view of a golf swing training machine in accordance with the present invention.
Figure 2:
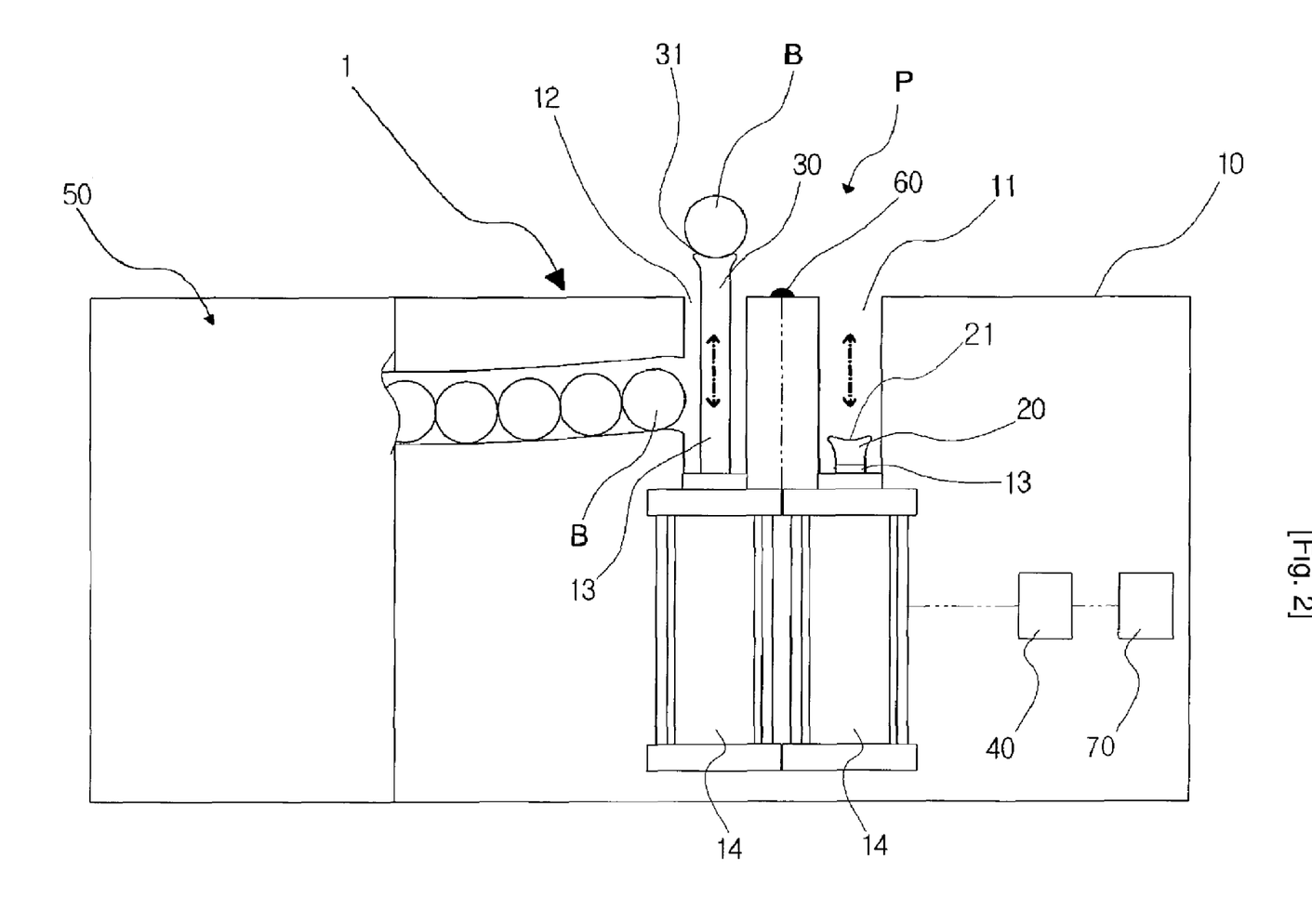
FIG. 2 is a sectional view of a golf swing training machine, to which an alternate structure of an aiming tee and a striking tee using pneumatic cylinders is applied.
Figure 3:
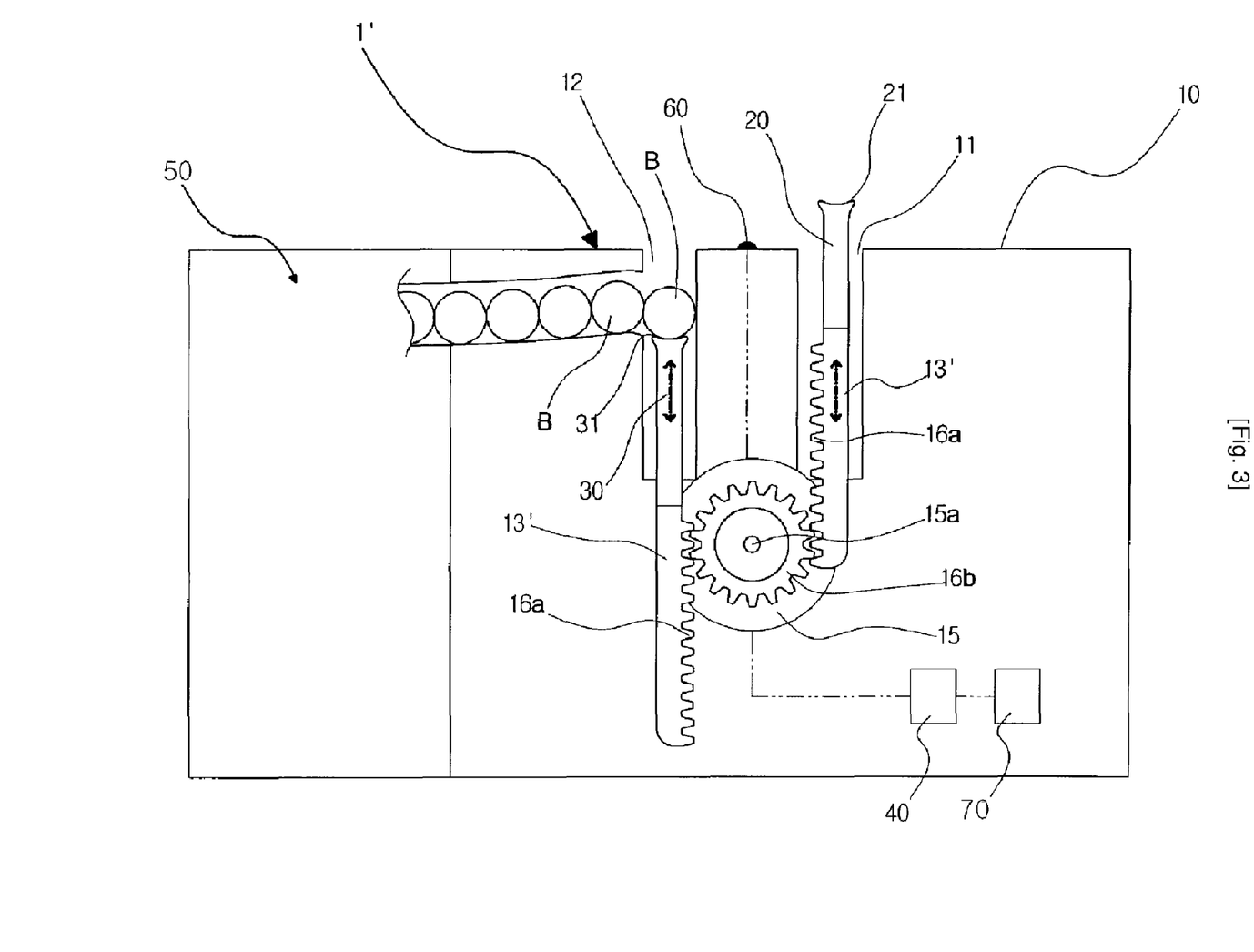
FIG. 3 is a sectional view of a golf swing training machine, to which an alternate structure of an aiming tee and a striking tee using racks and a pinion is applied.
Figure 4:
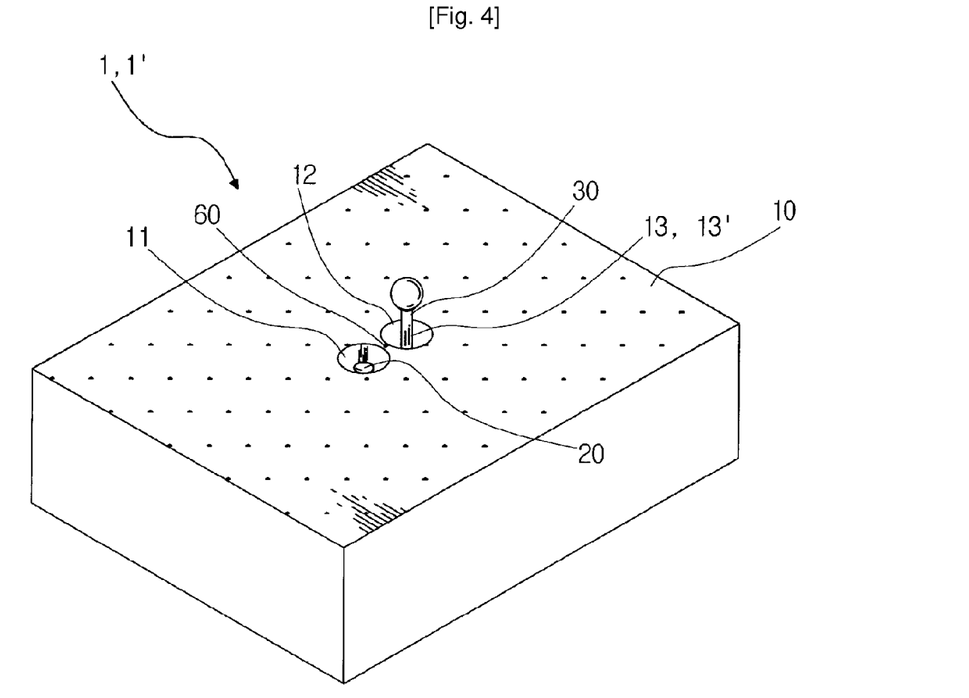
FIG. 4 is a perspective view of the golf swing training machine.

Here, as shown in FIG. 2, each of the elevating rods 13 includes a piston of a pneumatic cylinder 14, and as shown in FIG. 3, each of the elevating rods 13' is connected to a rotary shaft 15a of a driving motor 15 by a rack 16a and a pinion 16b.

Figure 5:
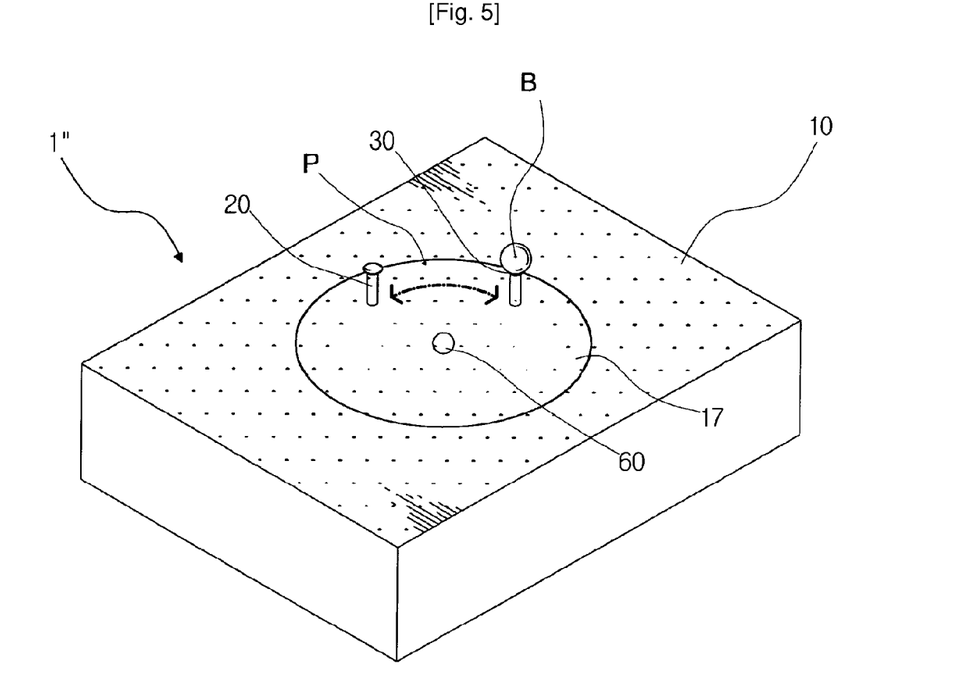
FIG. 5 is a perspective view of the golf swing training machine.
Figure 6:
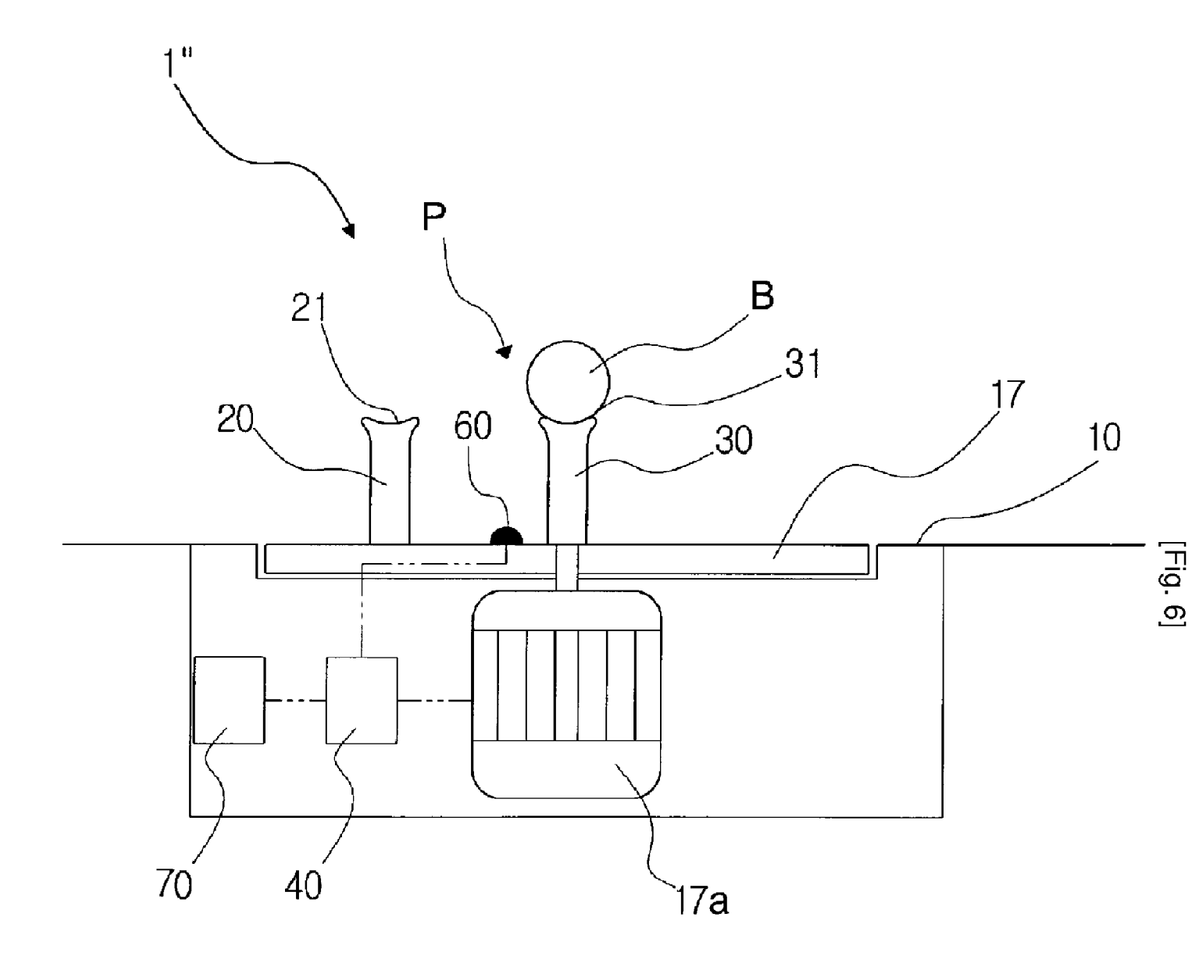
FIG. 6 is a sectional view of the golf swing training machine.

On the other hand, as shown in FIGS. 5 and 6, the aiming tee 20 and the striking tee 30 are installed on the edge of the turntable 17 at a designated interval. Then, the aiming tee 20 and striking tee 30 are alternately located at the striking point (P) on the training board 10 by the rotation of the turntable 17 due to the operation of a driving motor 17a.

The structure for alternately locating the aiming tee 20 and the striking tee 30 at the striking point (P) on the training board 10 is not limited to the above embodiments, but may be variously modified.

In the above embodiments, a sensor 60 for sensing the movement of a head of a golf club is provided at the striking point (P) on the training board 10 so that the aiming tee 20 and the striking tee 30 can be alternately located at the striking point (P) on the training board 10 at proper points of time. The sensor 60 initially senses a point of time when the head of the golf club secedes from the striking point (P), and then senses a point of time when the head of the golf club re-enters the striking point (P), in a swing process, thus controlling the aiming tee 20 and the striking tee 30 using the swing interval between the above points of time such that the aiming tee 20 and the striking tee 30 are alternately located at the striking point (P) on the training board 10.

That is, the alternate location of the aiming tee 20 and the striking tee 30 is not carried out using time data, which were stored in the microcomputer 40 in advance, but is carried out using trainee's swing time data, which are sensed by the sensor 60 and read by the microcomputer 40

By carrying out the alternate location of the aiming tee 20 and the striking tee 30 using the trainee's swing time data, the trainee can repeatedly practice the aiming through the aiming tee 20 and the striking of the golf ball (B) laid on the striking tee 30 according to his/her swing motion.

Accordingly, the trainee can practice the striking of a golf ball without a mental burden from the golf ball, thus mastering a natural swing posture in a short period of time.

Figure 7:
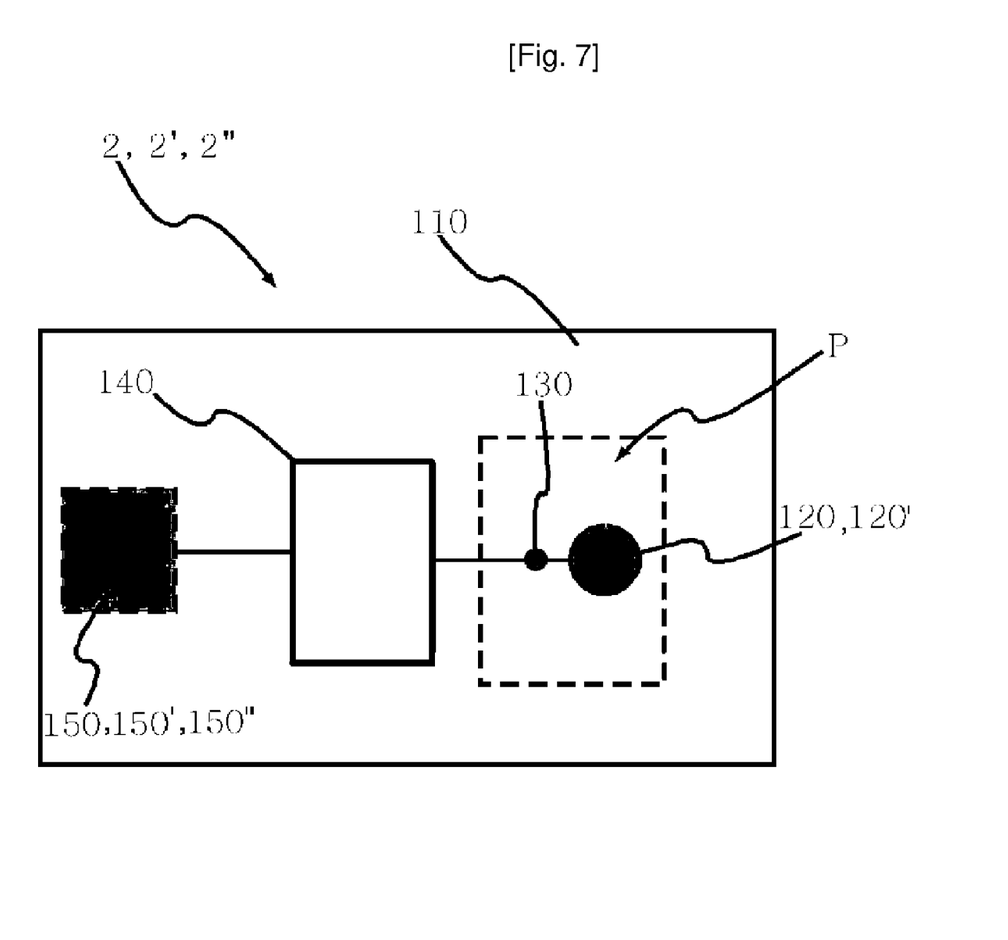
FIG. 7 is a schematic view of a golf swing training machine in accordance with a second aspect of the present invention.
Figure 8:
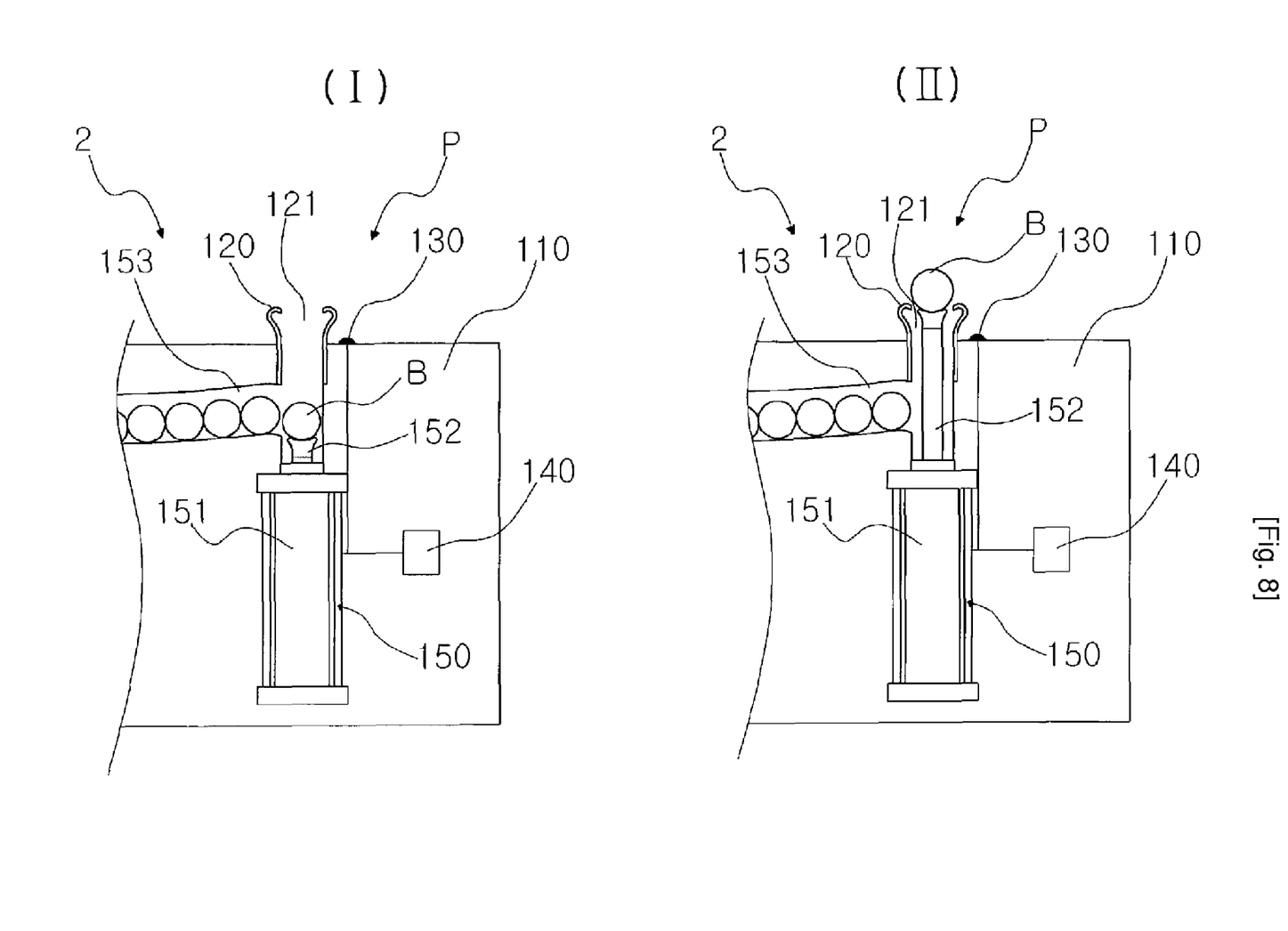
FIGS. 8 to 10 respectively illustrate golf swing training machines in accordance with several embodiments of the second aspect of the present invention.
Figure 9:
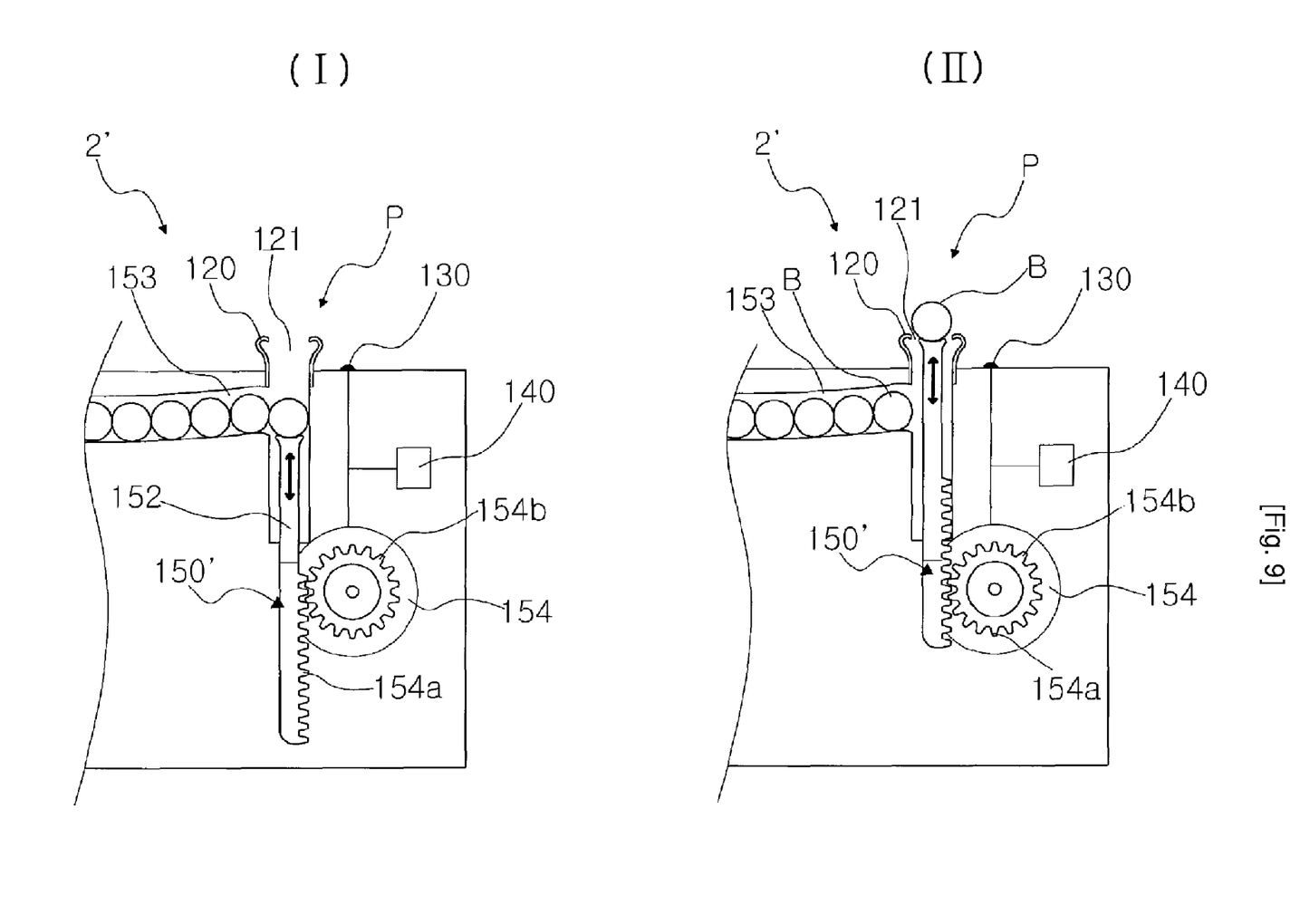
Figure 10:
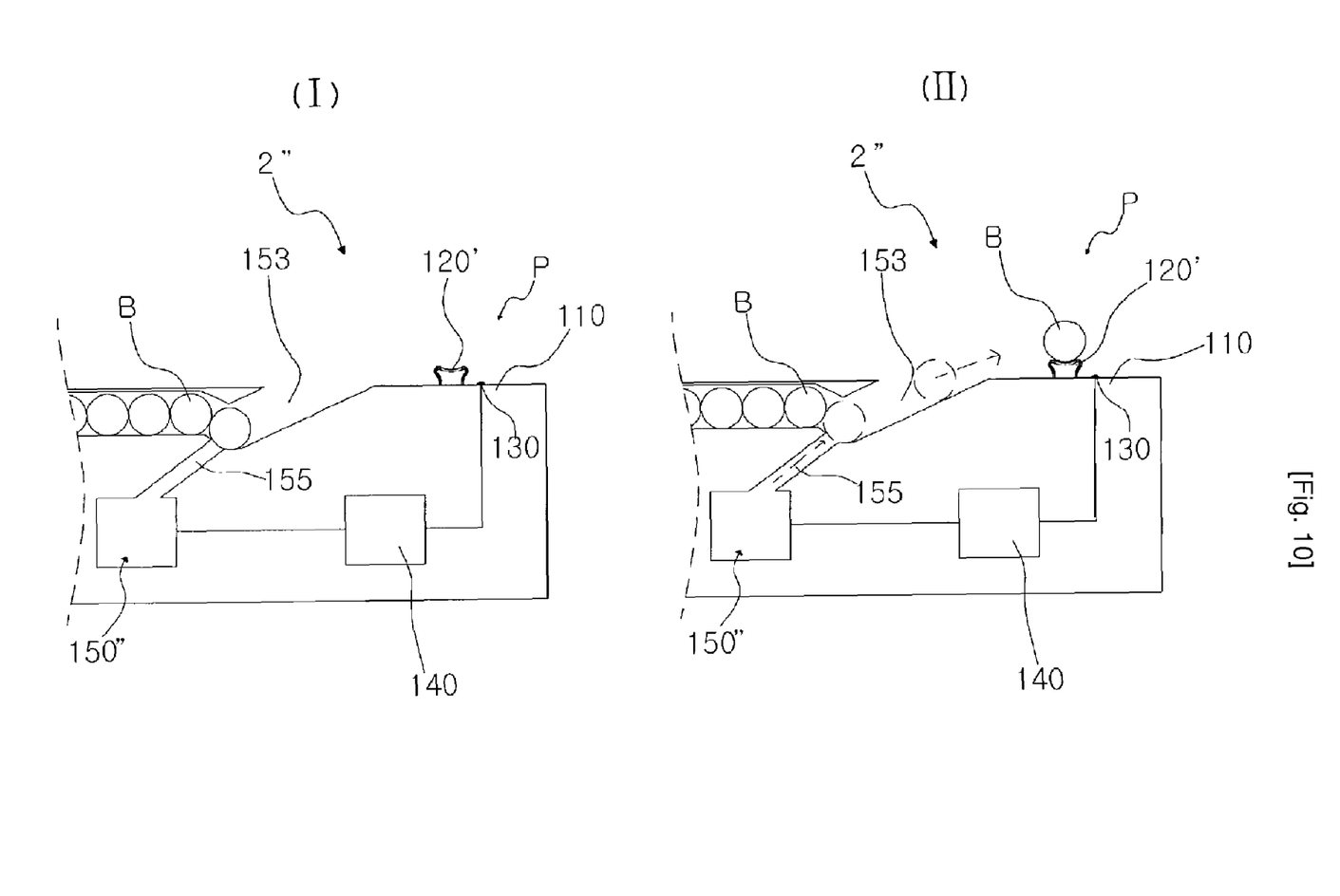

FIG. 7 is a schematic view of a golf swing training machine in accordance with a second aspect of the present invention, and FIGS. 8 to 10 respectively illustrate golf swing training machines in accordance with several embodiments of the second aspect of the present invention.

Hereinafter, with reference to FIGS. 7 to 10, golf swing training machines in accordance with the second aspect of the present invention will be described in detail.

First, with reference to FIG. 7, each of these golf swing training machines 2, 2' and 2" includes a training board 110, on which a striking point (P) is formed, a tee 120 or 120' protruded from the striking point (P), a golf ball supply module 150, 150' or 150" for supplying golf balls to the tee 120 or 120' one by one, a sensor 130 installed at the striking point (P) for sensing the movement of a head of a golf club (not shown) into and out of the striking point (P), and a microcomputer 140 for controlling the operation of the sensor 130 and the golf ball supply module 150, 150' or 150".

Although not shown in the drawings, each of these golf swing training machines 2, 2' and 2" further includes a power supply module for supplying power to the entire machine 2, 2' or 2" including the golf ball supply module 150, 150' or 150".

Here, the microcomputer 140 measures a swing interval using a point of time, when the head of the golf club secedes from the striking point (P) in a trainee's first swing motion, as a starting point and a point of time, when the head of the golf club re-enters the striking point (P), as an ending point through the sensor 130, and then calculates a time to reach an ending point of the trainee's subsequent swing motion using a point of time, when the head of the golf club secedes from the striking point (P) in this swing motion, as a starting point of this swing motion based on the measured swing interval. Thereby, the microcomputer 140 drives the golf ball supply module 150, 150' or 150" to supply a golf ball onto the tee 120 or 120' just before it reaches an ending point of this swing motion.

Thereafter, a process for controlling the golf swing training machine 2 or 2' in accordance with the second aspect of the present invention by means of the microcomputer 140 will be described in more detail. The process sequentially includes measuring a trainee's swing interval using the microcomputer 140, supplying the golf ball (B) onto the tee 120 or 120' by operating the golf ball supply module 150, 150', 150" based on the measured swing interval under the control of the microcomputer 140, and maintaining the golf ball to be laid onto the tee 120 or 120' while the trainee strikes the golf ball. While the trainee repeatedly practices swing and ball-striking motions, the supply of the golf ball and the maintenance of the golf ball are alternately repeated.

More specifically, in the measurement of the trainee's swing interval, the microcomputer 140 installed on the golf swing training machine 2, 2' or 2" measures and recognizes the swing interval using a point of time, when the head of the golf club secedes from the striking point (P) in a trainee's first swing motion, as a starting point, and a point of time, when the head of the golf club re-enters the striking point (P), as an ending point, through the sensor 130 provided at the striking point 130.

Thereafter, in the supply of the golf ball onto the tee 120 or 120' the microcomputer 140 measures a point of time, when the head of the golf club secedes from the striking point (P) in the trainee's subsequent swing motion through the sensor 130 after the measurement of the trainee's swing interval, and calculates a time to reach an ending point of this swing motion using the above point of time as a starting point of this swing motion based on the measured swing interval. Then, the microcomputer 140 drives the golf ball supply module 150, 150' or 150" to supply a golf ball onto the tee 120 or 120' just before it reaches the ending point of this swing motion.

Thereafter, in the maintenance of the golf ball, the head of the golf club, seceded from the striking point (P) in the trainee's swing motion, re-enters the striking point (P) and strikes the golf ball laid onto the tee 120 or 120's. In this step, the tee 120 or 120' is maintained without any movement as it is until the head of the golf club strikes the golf ball laid thereon.

Hereinafter, with reference to FIGS. 8 and 9, golf swing training machines 2 and 2' in accordance with a first embodiment of the second aspect of the present invention will be described. These golf swing training machines 2 and 2' have the same constitution as that of the above other golf swing training machines in accordance with the second aspect of the present invention.

However, as shown in FIGS. 8 and 9, a hollow tee 120, the upper portion of which is opened, is installed at the striking point (P) on the training board 110. Further, a golf ball supply module 150 or 150' includes a golf ball supply channel 153, through which golf balls (B) are supplied, formed under the striking point (P) of the training board 110, and an elevating rod 152, which ascends and descends in a hollow 121 of the tee 120 so as to receive the golf balls (B) supplied from the golf ball supply channel 153 on the upper end thereof one by one and expose the golf balls (B) to the outside through the upper surface of the tee 120.

The hollow 121 of the tee 120 has a diameter larger than that of the golf ball (B) so that the golf ball (B) can freely pass through the hollow 121.

The elevating rod 152 of the golf ball supply module 150 or 150' which ascends and descends in the hollow 121 of the tee 120, is connected to a pneumatic cylinder 151, and thus ascends and descends by means of the operation of the pneumatic cylinder 151, as shown in FIG. 8, or is connected to an electric motor 154 by a rack 154a and a pinion 154b, and thus ascends and descends by means of the operation of the electric motor 154, as shown in FIG. 9.

Based on the above constitution, when a trainee aims at the hollow tee 120, no golf ball is laid on the hollow tee 120, as shown in FIGS. 8(I) and 9(I), and when a head of a trainee's golf club, finishing a back swing motion, reaches a position adjacent to the striking point (P), the elevating rod 152 of the golf ball supply module 150 or 150' ascends under the control of the microcomputer 140 and a golf ball (B) is laid on the hollow tee 120, as shown in FIGS. 8(II) and 9(II). Consequently, the trainee does not aim directly at the golf ball but aims at the tee 120 having no golf ball (B) laid thereon, and then swings and strikes the golf ball (B) laid on the tee 120, thus being capable of striking the golf ball (B) in a stable mental state without a burden from the golf ball (B).

Next, with reference to FIG. 10, a golf swing training machine 2" in accordance with a second embodiment of the second aspect of the present invention will be described. This golf swing training machine 2" is similar to the golf swing training machines 2 and 2' in the first embodiment in that the golf swing training machine 2" has the same constitution as that of the other swing training machines in accordance with the second aspect of the present invention. However, this golf swing training machine 2" differs from the golf swing training machines 2 and 2' in the first embodiment in that golf balls (B) are laid on a tee 120' of the golf swing training machine 2" by shooting one by one.

That is, in the golf swing training machine 2" in accordance with this embodiment, the tee 120' is protruded from the striking point (P) on the training board 110, and a golf ball supply module 150" for shooting the golf balls (B) onto the upper end of the tee 120' one by one is provided at one side of the tee 120'. For example, the golf ball supply module 150" shoots the golf balls (B) onto the tee 120' using air pressure, as shown in FIG. 10. In FIG. 10, reference numeral 153 represents a golf ball outlet, through which the golf balls (B) are discharged, and reference numeral 155 represents an air outlet, through which compressed air is discharged.

In the golf swing training machine 2" in accordance with the second embodiment in the same manner as the golf swing training machines 2 and 2' in accordance with the first embodiment, when a trainee aims at the tee 120', no golf ball is laid on the tee 120', and when a head of a trainee's golf club, finishing a back swing motion, re-enters the striking point (P), the golf ball supply module 150" is operated under the control of the microcomputer 140 so that a golf ball (B) is supplied to the tee 120'. Thus, the trainee can strike the golf ball (B) in a stable mental state without a burden from the golf ball (B).

INDUSTRIAL APPLICABILITY

The golf swing training machine of the present invention allows golf beginners to master a swing posture and a striking posture in a short period of time without a burden from a golf ball, thus being installed in an indoor golf practice range so that trainees can effectively practice swing and striking postures with the machine.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A golf swing training machine comprising:
a striking tee provided with a seat, on which a golf ball supplied from a golf ball supply device is laid, and an aiming tee provided with a seat, on which no golf ball is laid, said striking and aiming tees are installed at a striking point on a training board such that they are adjacent to each other; and
a microcomputer for controlling the striking and aiming tees such that they are alternately located at the striking point,
wherein when a trainee aims at the striking point, the aiming tee is located at the striking point on the training board, and when a head of a golf club, finishing a back swing motion, reaches a position adjacent to the striking point, the striking tee provided with the seat having the golf ball laid thereon is located at the striking point on the training board.

2. The golf swing training machine according to claim 1, wherein a pair of concaves for respectively receiving the aiming tee and the striking tee is formed in the upper surface of the training board at the striking point, elevating rods ascending and descending under the control of the microcomputer are respectively prepared in the concaves, and the aiming tee and the striking tee are respectively installed in the elevating rods so that the aiming tee and the striking tee are alternately located at the striking point on the training board by the ascent and descent of the elevating rods.

3. The golf swing training machine according to claim 2, wherein each of the elevating rods includes a piston of a pneumatic cylinder.

4. The golf swing training machine according to claim 2, wherein each of the elevating rods is connected to a rotary shaft of a driving motor by a rack and a pinion.

5. The golf swing training machine according to claim 1, wherein a turntable rotated in one direction by the operation of an electric motor is provided at the striking point on the training board, and the aiming tee and the striking tee are installed on the edge of the turntable at a designated interval, so that the aiming tee and the striking tee are alternately located at the striking point on the training board by the rotation of the turntable due to the operation of the electric motor.

6. The golf swing training machine according to claim 1, wherein a sensor for sensing the movement of the head of the golf club is provided at the striking point on the training board, and senses a point of time, when the head of the golf club secedes from the striking point in an initial swing motion, and a point of time, when the head of the golf club re-enters the striking point, so that the aiming tee and the striking tee are alternately located at the striking point on the training board according to an interval between these points of time.

* * * * *